United States Patent [19]
Iwata et al.

[11] Patent Number: 5,546,259
[45] Date of Patent: Aug. 13, 1996

[54] TAPE TRANSPORTING APPARATUS INCLUDING A TAPE GUIDE WITH VARIABLE RESTRICTING FORCE REGIONS, EACH USED DEPENDING UPON THE AMOUNT OF TAPE TENSION

[75] Inventors: Noriya Iwata, Osaka; Kenji Matuura; Shigeki Murata, both of Nara, all of Japan

[73] Assignee: Matsushita Electric Industrial Co., Ltd., Osaka, Japan

[21] Appl. No.: 500,139

[22] Filed: Jul. 10, 1995

Related U.S. Application Data

[63] Continuation of Ser. No. 156,821, Nov. 24, 1993, abandoned.

[30] Foreign Application Priority Data

Nov. 25, 1992 [JP] Japan ................................. 4-314833
Nov. 25, 1992 [JP] Japan ................................. 4-314834

[51] Int. Cl.$^6$ ........................... G11B 15/60; G11B 5/027
[52] U.S. Cl. ........... 360/130.220; 360/85; 242/615.300; 226/197
[58] Field of Search ........................... 360/130.2, 130.21, 360/130.22, 130.23, 130.3, 130.31, 83–85, 90, 93, 95; 242/548.2, 615.3, 615.2, 346, 346.1; 226/197

[56] References Cited

U.S. PATENT DOCUMENTS

| 3,790,055 | 2/1974 | Sims, Jr. ........................... 360/130.2 X |
| 4,017,897 | 4/1977 | Blanding ........................ 360/130.23 X |
| 4,962,438 | 10/1990 | Kunze ................................ 360/130.21 |
| 5,289,331 | 2/1994 | Eaton et al. ........................ 360/130.21 |

FOREIGN PATENT DOCUMENTS

| 63-54400 | 9/1989 | Japan . |
| 63-119237 | 11/1989 | Japan . |
| 64-217333 | 4/1991 | Japan . |

*Primary Examiner*—Andrew L. Sniezek
*Attorney, Agent, or Firm*—McDermott, Will & Emery

[57] ABSTRACT

A tape transporting apparatus comprising a detecting device for detecting the winding diameter of a reel or the travelling state of tape, and a height variable device for varying the tape restricting height of a tape guide depending on the output of the detecting device, in which the tape restricting height is varied when the tape is deformed when the winding diameter becomes small and the tape tension becomes large, thereby preventing tape damage.

1 Claim, 14 Drawing Sheets

TAPE TRANSPORTING APPARATUS INCLUDING A TAPE GUIDE WITH VARIABLE RESTRICTING FORCE REGIONS, EACH USED DEPENDING UPON THE AMOUNT OF TAPE TENSION

This is a continuation of application Ser. No. 08/156,821 filed Nov. 24, 1993, abandoned.

FIELD OF THE INVENTION

The present invention relates to a tape transporting apparatus in a magnetic recording and reproducing apparatus, such as in a Video Tape Recorder ("VTR").

BACKGROUND OF THE INVENTION

The present invention is directed to an improvement in tape transporting apparatuses modified to ensure stable running while preventing damage to tapes of varying thickness in all operating modes, including loading and unloading of the tape.

A conventional tape transporting apparatus 300 is illustrated in FIG. 14. A tape 4 is initially drawn out from a cassette 1 and wound around a cylinder 5 by inclined posts 8 and 9, guide posts 10, 11, 12, and 15, and a tension regulator post 13. The cassette 1 accommodates two reels, a supply reel 2 and a take-up reel 3. After loading, the movement of the tape 4 is controlled by the rotation of a capstan 6, which moves the tape out from the supply reel 2, between the capstan 6 and a pinch roller 7, and into the take-up reel 3. When the tape transporting apparatus 300 operates in play or record mode, the tape 4 has a relatively low tension which is maintained by the guide posts 10, 11, 12, and 15 that stabilize the travelling height of the tape 4 and by the tension regulator post 13 that adjusts the load torque of the feed reel 2.

However, when the tape 4 travels in the reverse direction, as in the rewind mode, the tension regulator post 13 is inactive and the take-up torque exerted on the tape 4 is constant. As a result, the tension in the tape varies significantly, depending on the winding diameter of the tape on the reel taking up the tape. When the winding diameter is small, the tension in the tape 4 is high, increasing the likelihood that the guide posts will cause damage to the tape.

The prior art addresses this problem by setting the guide posts to provide a broader range of running heights available to the tape, thus exerting less pressure on the tape. This decreases the likelihood that the guide posts will damage the tape when the tension in the tape is high, such as when the tape transporting apparatus is in rewind mode.

When the tension in the tape is high, the concern is to prevent damage to the tape. Conversely, when the tension in the tape is low, the likelihood that the guide posts will damage the tape is low, but the tension in the tape may be insufficient to keep the tape at a stable travelling height. Thus, the concern is to set the guide posts to sufficiently narrow the range of travelling heights available to the tape to provide enough guidance to the tape to ensure stable travelling.

While the prior art may prevent damage to the tape when the tension in the tape is high by increasing the range of available travelling heights, the prior art does not always provide sufficient guidance to the travelling height of the tape when the tension in the tape is low, such as when the tape transporting apparatus is in play or record mode. Consequently, the reproduction envelope is not stabilized and travelling of the tape is unstable. Moreover, with technological advances, tapes have become thinner, and may not have the strength to withstand even the less constricting pressure exerted by the guide posts provided by current tape transporting apparatuses.

As can be seen, the prior art tape transporting apparatuses provide some protection against damaging tapes when the tape tension is high. Nevertheless, none of these devices adjust the guidance given to a tape to the tension in the tape at a particular time, which provides the important advantage of ensuring stable operation as well as preventing damage to the tape. The current invention also prevents damage to the tape while the tape is being loaded and unloaded. An additional advantage achieved by the current invention is the capability of the tape transporting apparatuses to safely handle very thin tapes.

SUMMARY OF THE INVENTION

According to this invention, a tape transporting apparatus is provided for use with tapes of various thickness, minimizing damage to the tapes and enabling stable operation. The tape transporting apparatus of this invention comprises a tension detecting device that monitors the tension in the tape and indicates the degree of tension that exists at a particular time. A height variable device responds to the existing tension indicated by the tension detecting device by adjusting the height range available to the tape.

Preferably, the inventive tape transporting apparatus comprises a winding diameter detecting means (or device) for detecting the winding diameter of a tape wound on a tape reel, which varies the tension in the tape, and a height variable means (or device) for varying the tape restricting height of a tape guide depending on the output from the winding diameter detecting device.

More preferably, the inventive tape transporting apparatus comprises a tape travelling detecting means (or device) for detecting the travelling state of a tape, from which the tension in the tape can be determined. This embodiment also comprises a height variable means (or device) for varying the tape restricting height of a tape guide depending on the output from the tape travelling detecting means (or device).

As pointed out above, the height variable means responds to the tension in the tape at a particular time. This enables excellent handling of the tape, preventing damage to the tape when the tension in the tape is high, yet ensuring stable operation when the tension in the tape is low.

In accordance with this invention, a tape transporting apparatus is provided that prevents damage to a tape while the tape is being loaded and unloaded into the tape transporting apparatus. The tape transporting apparatus of this invention comprises a tension detecting device for detecting the tension in the tape while loading and unloading the tape. The tension detecting device indicates the tape tension detected to a height variable device, which adjusts the range of available heights to the tape in response to the tension detecting device.

In further accordance with the invention, a method of handling a tape is provided for a tape transporting apparatus. This method comprises providing a tension detecting device for detecting and indicating the tension in a tape. A height variable device responds to the tension detecting device by accordingly adjusting the range of travelling heights available to the tape.

As pointed out in greater detail below, the tape transporting apparatus and method of handing a tape in a tape transporting apparatus of this invention provides important advantages. The present invention minimizes damage to even a very thin tape in all operations, including loading and unloading, and maximizes the stability of travelling.

The invention itself, together with further objects and attendant advantages, will best be understood by reference to the following detailed description taken in conjunction with the accompanying drawings.

DESCRIPTION OF THE PREFERRED EMBODIMENTS

Figure 1:
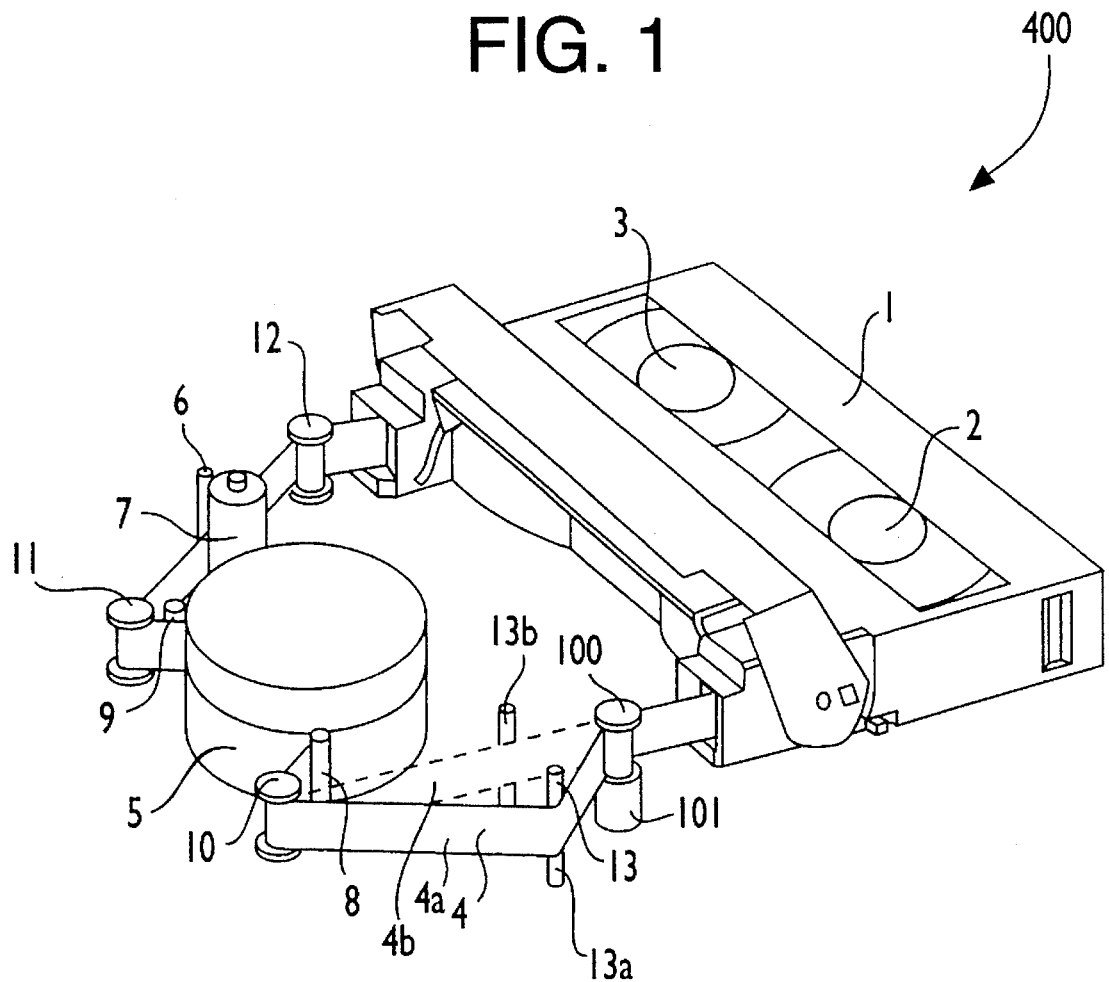
FIG. 1 represents a perspective view in a first embodiment of the invention.
Figure 2:
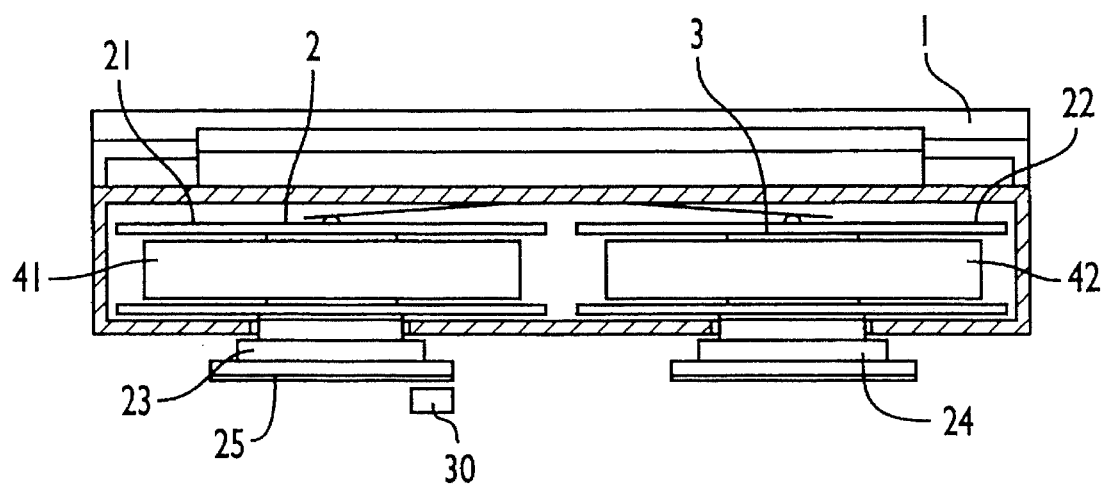
FIG. 2 represents a side view showing a winding diameter detecting means (or device) of the embodiment of FIG. 1.

Turning now to the drawings, FIGS. 1 and 2 represent a first embodiment of a tape transporting apparatus 400 of this invention. A cassette 1 accommodates a supply reel 2 and a take-up reel 3. Inclined posts 8 and 9 change the inclination of the tape, and guide posts 10, 11 and 12 define the height of a tape 4. During loading, the tape 4 is drawn out of the cassette 1 by means of the inclined posts 8 and 9, guide posts 10, 11 and 12, and a tension regulator post 13, and is spirally wound on a cylinder 5. When this action is completed, operation of the tape 4 is controlled by the rotation of a capstan 6, which sends the tape 4 from the supply reel 2, between the capstan 6 and a pinch roller 7, into the take-up reel 3.

The tension regulator post 13 is in a state of 13a when the tape 4 is in a state of 4a, indicating that there is low tension in the tape 4. Such a state typically exists when the tape transporting apparatus is in play mode and record mode. Tension regulator post 13 is in a state of 13b when the tape 4 is in a state of 4b, indicating that there is high tension in the tape 4. This state typically exists when the tape transporting apparatus is in rewind mode.

A variable guide post 100 defines the minimum travelling height of the tape 4 and is affixed to the upper surface of a laminated piezoelectric element 101. The laminated piezoelectric element 101 expands and contracts in the vertical direction in response to an output from a winding diameter detecting means (or device), and as shown in FIG. 2, moves the variable guide post 100 vertically, varying the minimum travelling height of the tape 4.

Turning to FIG. 2, an example of a winding diameter detecting device is shown in which the supply reel 2 has a tape roll 41 wound on a reel hub 21, and a take-up reel 3 has a tape roll 42 wound on a reel hub 22. The rotations of reel turntables 23 and 24 are respectively transmitted to the reel hubs 21 and 22. A reflector 25 adheres to the bottom of the reel turntable 23. The reflector 25 is divided into alternating sectors of reflecting sectors and non-reflecting sectors. A reflection type photo sensor 30 is affixed at a specific position beneath the lower surface of the reflector 25. When the reel turntable 23 rotates, the reflecting sectors and non-reflecting sectors of the reflector 25 alternately pass over the reflection type photo sensor 30, and the quantity of light received by the reflection type photo sensor 30 varies periodically. The reflection type photo sensor 30 issues output pulse signals in response to the quantity of light it receives. From the output pulse signals, the rotating speed of the reel turntable 23 can be calculated.

Referring again to FIG. 1, when the speed of the tape 4 as it winds around cylinder 5 is held constant, the rotating speed of the reel turntable 23 varies with the winding diameter of the tape roll 41. Specifically, when the rotating speed of the reel turntable 23 is slow, the winding diameter of the tape roll 41 is large, and when the rotating speed of the reel turntable 23 is fast, the winding diameter of the tape roll 41 is small. Hence, by detecting the rotating speed of the reel turntable 23, the winding diameter of the tape roll 41 can be calculated.

As the winding diameter of the tape roll 41 varies, the frequency of the output pulse signal delivered by the reflection type photo sensor 30 changes. When the period of the output pulse signal changes, a voltage sent to the laminated piezoelectric element 101 also changes. This voltage is proportional to the winding diameter of the tape roll 41 on the reel turntable 23. Therefore, when the winding diameter of the tape roll 41 is large, the voltage supplied to the laminated piezoelectric element 101 is high and the minimum travelling height for the lower edge of the tape 4 will also be high. When the winding diameter of the tape roll 41 is small, the voltage supplied to the laminated piezoelectric element 101 is low and the minimum travelling height for defining the lower edge of the tape 4 will also be low.

In reverse travelling, as in a rewind mode, the reel turntable 23 takes up the tape 4 at a constant torque. As a result, when the winding diameter of the tape roll 41 is small, the tension in the tape 4 is high, and when the winding diameter of the tape roll 41 is large, the tension in the tape 4 is low. When the tension in the tape 4 is high, the tape 4 is likely to be damaged.

However, in the embodiment shown in FIGS. 1 and 2, the reflection type photo sensor 30 detects the small winding diameter of the tape roll 41 indicating the high tension in the tape 4. As a result, the laminated piezoelectric element 101 receives only a small voltage, which causes the laminated piezoelectric element 101 to contract, lowering the variable guide post 100, and thus lowering the minimum travelling height for the tape 4. This lower minimum travelling height decreases the restricting force exerted on the lower edge of tape 4, decreasing the likelihood that tape 4 will be damaged.

In this embodiment, the winding diameter of the supply reel 2 is detected, but the winding diameter of the take-up reel 3 may be also detected by affixing the reflector 25 to the lower surface of the reel turntable 24 and installing the reflection type photo sensor 30 beneath the reel turntable 24. The winding diameter of the take-up reel 3 is inversely proportional to the winding diameter of the supply reel 2.

Therefore, when the winding diameter of the tape roll 42 on the take-up reel 3 is large, the winding diameter of the tape roll 41 on the supply reel 2 is small. Therefore, when the winding diameter of the tape roll 42 on the take-up reel 3 is large, the voltage supplied to the laminated piezoelectric element 101 is small. Alternatively, by affixing reflectors to the lower surfaces of both reel turntables 23 and 24 and installing reflection type photo sensors beneath both reel turntables 23 and 24 and comparing the outputs of the reflection type photo sensors, the ratio of winding diameters of the tape rolls 41 and 42 can be obtained. From this winding diameter ratio, the minimum travelling height for the tape 4 may be varied.

Variations on the embodiments described above are possible. For example, determining the winding diameter of any of tape rolls 41 and 42 can be accomplished by directly detecting the winding diameter by a photo sensor or similar device. Alternatively, the winding diameter of any of tape rolls 41 and 42 can be determined by memory information in the cassette 1 or from data stored in the tape 4.

Figure 3:
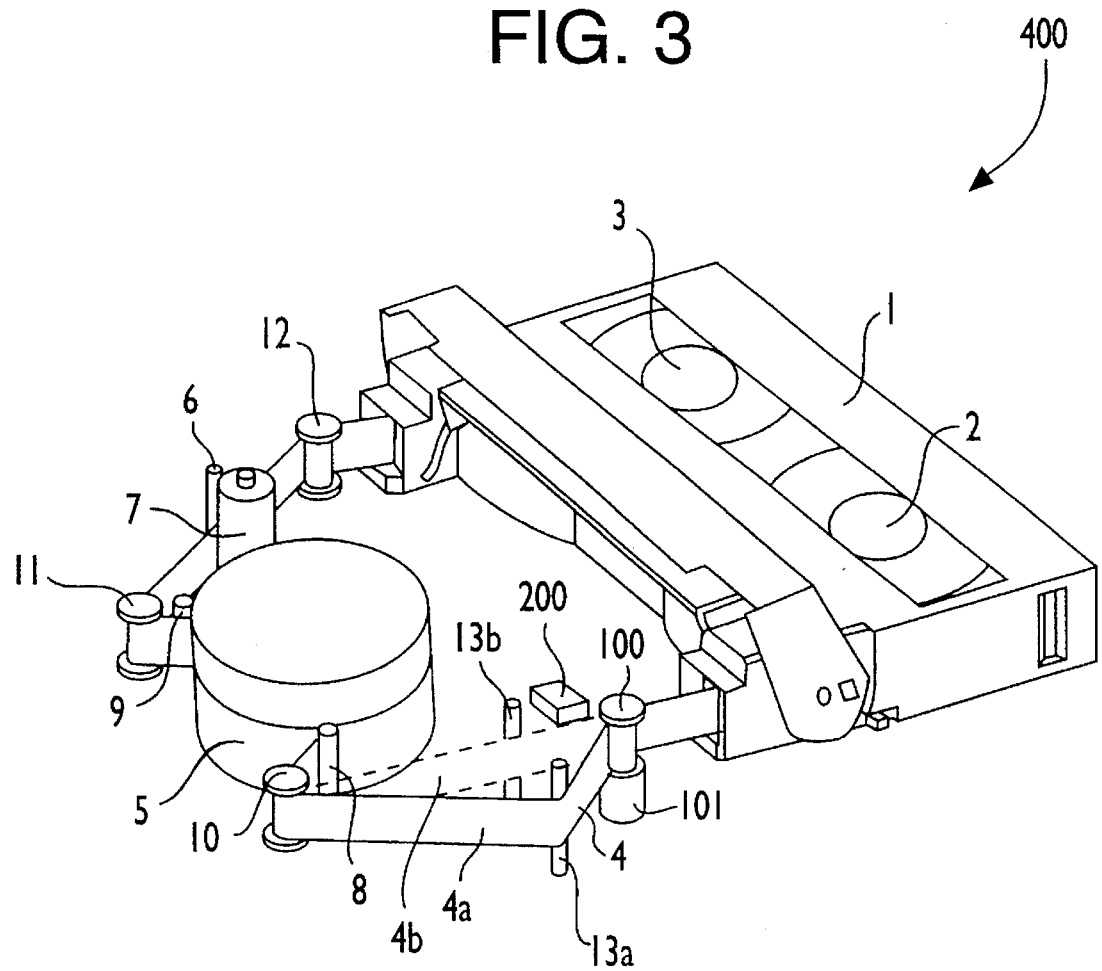
FIG. 3 represents a perspective view in a second embodiment of the invention, showing a deformation detecting device.
Figure 4:
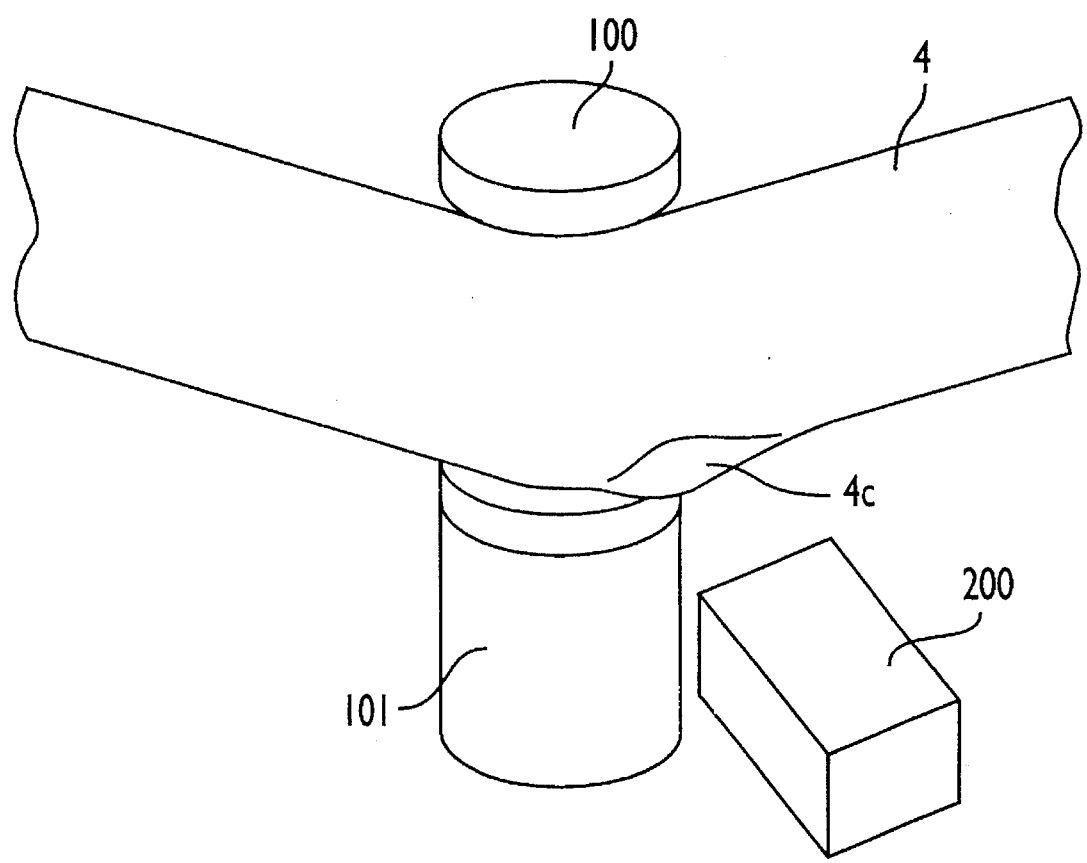
FIG. 4 represents a perspective view of a variable guide post of the embodiment of FIG. 3.
Figure 5:
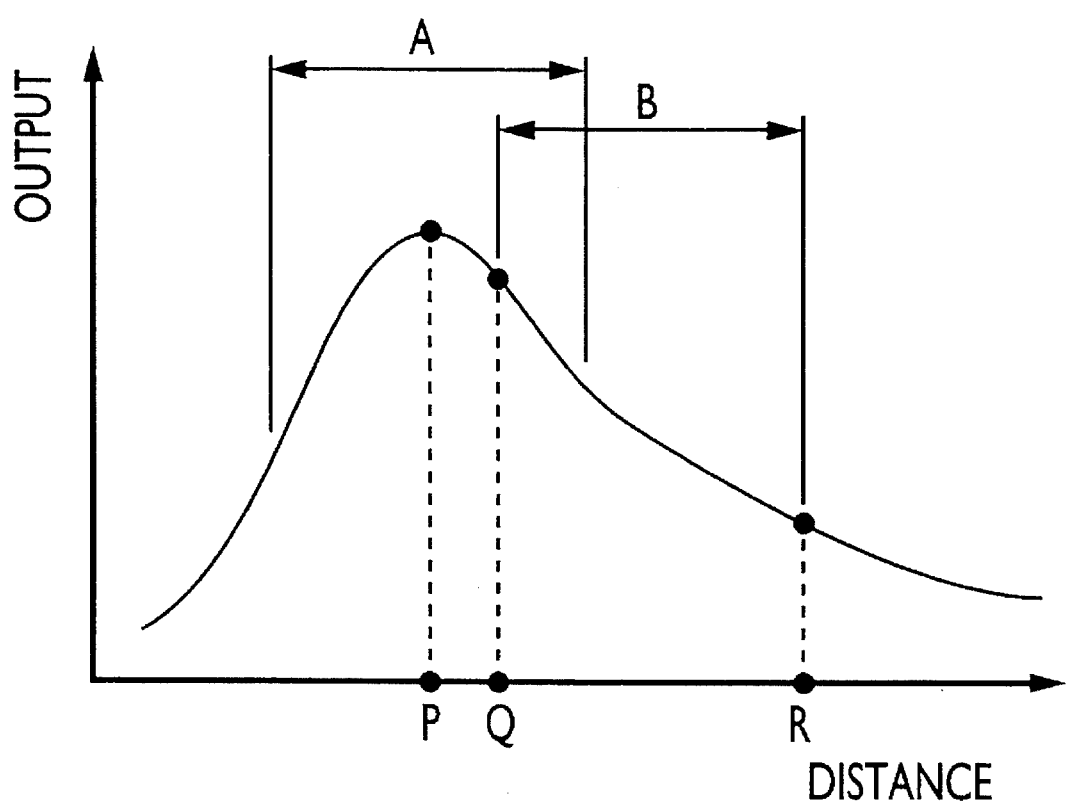
FIG. 5 represents a characteristic diagram of the operation of the photo sensor in the embodiment of FIG. 3.

FIGS. 3–5 show a second embodiment of the current invention, showing a tape deformation detecting means (or device), which by way of illustration, can be viewed in conjunction with FIG. 1. FIG. 3 is a perspective view in which a photo sensor 200 comprises an emitter and a receiver. The photo sensor 200 is installed at a specific distance P, indicated in FIG. 5, from the tape 4 at the variable guide post 100. A voltage supplied to the laminated piezoelectric element 101 varies with the quantity of light received by the receiver, which in turn, varies with the distance between the receiver and the tape 4 at the variable guide post 100.

FIG. 5 shows the relation between the distance between the receiver and the tape 4 at the variable guide post 100 and the output from the photo sensor 200. The possible range of the distance between the receiver and the tape 4 at the variable guide post 100 is the range A, indicated in FIG. 5. The voltage received by the laminated piezoelectric element 101 varies with the output from the photo sensor 200, and the laminated piezoelectric element 101 expands and contracts in the vertical direction in proportion to the voltage, moving the variable guide post 100 up and down, thus varying the minimum travelling height of the tape 4.

FIG. 4 shows a possible deformed state of the tape 4 in the second embodiment of the invention. When the tape 4 is deformed, the distance between the deformation 4c of the tape 4 and the photo sensor 200 is changed. Referring again to FIG. 5, the distance varies from distance P and the output decreases suddenly. The voltage received by the laminated piezoelectric element 101 decreases as well and the laminated piezoelectric element 101 contracts, lowering the variable guide post 100 and the minimum travelling height of the tape 4.

Referring again to FIG. 3, when the tension in the tape 4 is low, such as during play mode, stable travelling of the tape 4 is difficult to maintain. When the tension in the tape 4 is low, the tape 4 travels in a state of 4a without being deformed. Therefore, the distance between the photo sensor 200 and tape 4 is constant at distance P, and the output from the photo sensor 200 is large. The laminated piezoelectric element 101 receives high voltage and expands, raising the minimum travelling height of the tape 4. Thus, when the tension in the tape 4 is low and travelling of the tape 4 is likely to be unstable, the embodiment shown in FIGS. 3–5 ensures that the minimum travelling height of the tape 4 at the variable guide post 100 is set high, providing sufficient restricting force to the tape 4 so that the tape 4 travels stably.

Still referring to FIG. 3, when operation on the tape 4 is changed from a low tension mode to a relatively high tension mode, such as rewind mode, the tape 4 travels in a state of 4b. At the instant that the mode of operation is changed, the laminated piezoelectric element 101 is expanded, setting the variable guide post 100 at a high level. Generally, when the height of the tape 4 is held constant, the strength of the tape 4 is inversely proportional to the tension in the tape 4. Therefore, the high tension in the tape 4 weakens the strength of the tape 4. In this weakened state, the high level of the variable guide post 100 is likely deform the tape 4. When the tape 4 is deformed, likelihood of damage to the lower edge of the tape 4 is high. Hence, it is critical to eliminate deformation of the tape 4 as quickly as possible.

As shown in FIG. 4, when the lower portion of the tape 4 is deformed, the distance between the deformation 4c and the photo sensor 200 deviates from the distance P. Referring to FIG. 5, this deviation results in an abrupt decrease in output. The laminated piezoelectric element 101 receives a decrease in voltage causing it to contract, lowering the minimum travelling height for the tape 4 set by the variable guide post 100. When the variable guide post 100 is lowered, the force restricting exerted by the variable guide post 100 on the tape 4 is decreased. Thus, the embodiment shown in FIGS. 3–5 eliminates the deformation 4c of the tape 4 when the tension in tape 4 is high, preventing damage to the tape 4.

Merely by way of example, in the embodiment shown in FIGS. 3–5, the lower edge of the tape 4 is defined by the variable guide post 100, but the travelling height of the tape 4 can also be defined by the upper edge of the tape 4. In such a case, the maximum travelling height for the tape 4 is set by the variable guide post 100, which is set to be inversely proportional to the output from the photo sensor 200.

In yet another variation of the invention, the means of varying the travelling height of the tape 4, aside from the embodiment of varying the position of the entire variable guide post 100 up and down, may also be modified. For example, the height of the tape 4 can be varied by using an inclined flange, and varying the portion of the inclined flange in contact with the tape 4 by rotating the inclined flange.

Figure 6:
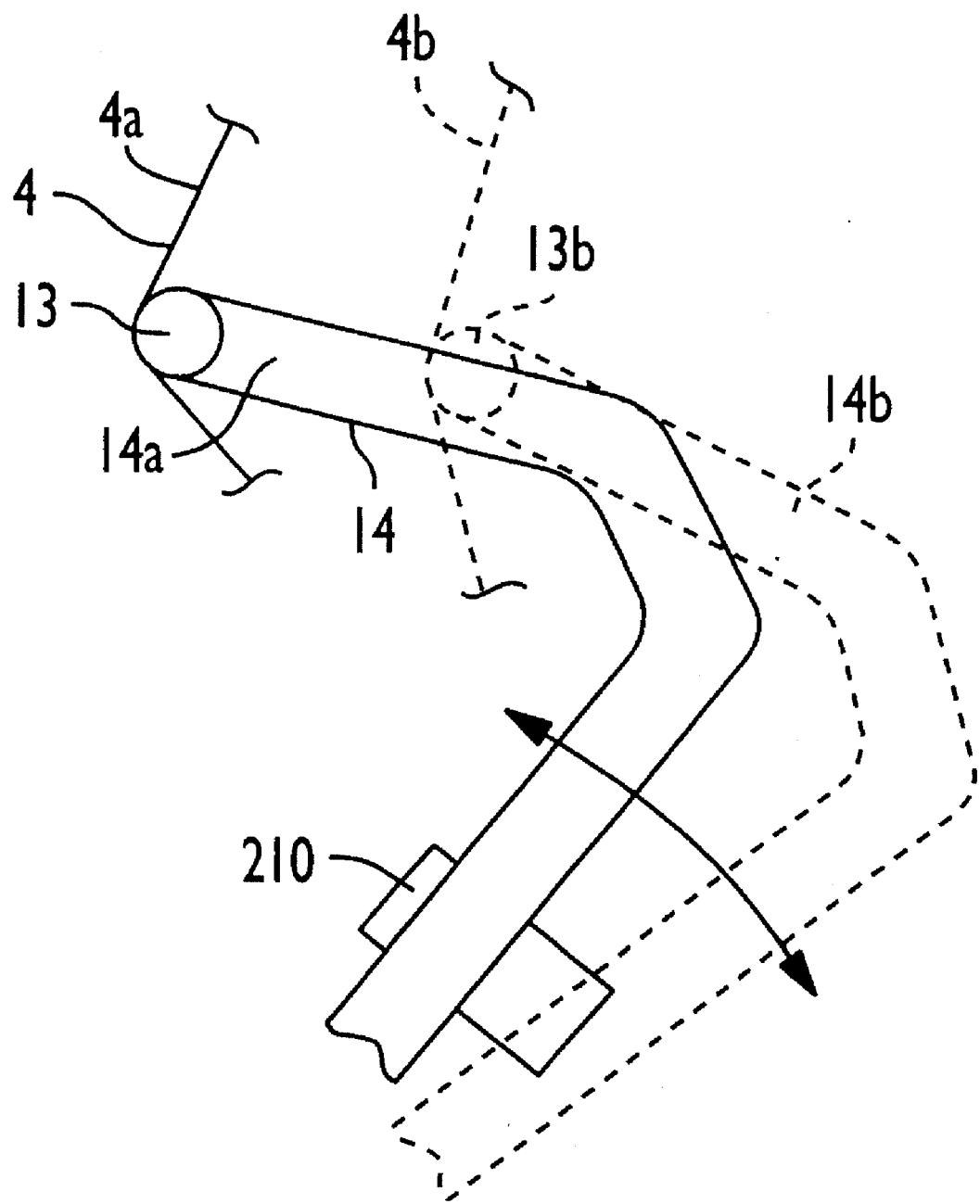
FIG. 6 represents a plan view in a third embodiment of the invention showing a tape path detecting means (or device).

Turning now to FIG. 6, a third embodiment of the invention is represented, showing a tape path detecting means (or device), which by way of example can be viewed in conjunction with FIG. 1, in which a tension regulator post 13 is affixed to the upper surface of a tension regulator arm 14. The tension regulator arm 14 rotates as indicated by the arrow about a support shaft (not shown) depending on the force exerted by the tape 4 on the tension regulator post 13. When the tension in the tape 4 is low, the force exerted by the tape 4 on the tension regulator post 13 is small. Thus, the tension regulator post 13 is in a state 13a and the tension regulator arm 14 is in a state of 14a. Conversely, when tension in the tape 4 is high, the tape exerts a strong force on the tension regulator post 13, which causes the tension regulator post 13 to be in state 13b. This, in turn, causes the tension regulator arm 14 to be in at a state 14b.

A photo sensor 210 is affixed at a specific position beneath the lower surface of the tension regulator arm 14. The quantity of light received by the photo sensor 210 depends on the position of the tension regulator arm 14, and determines the output from the photo sensor 210. The output from the photo sensor 210 determines the voltage received by the laminated piezoelectric element 101.

Merely by way of example, the embodiment shown in FIG. 6 positions the photo sensor 210 such that the quantity of light received by the photo sensor 210 is maximized when the tension regulator arm 14 is in the state of 14a. Therefore, when the tension regulator arm 14 moves to the state of 14b, the quantity of light received by the photo sensor 210 decreases, lowering the output from the photo sensor 210. As a result, the voltage received by the laminated piezoelectric element 101 decreases the laminated piezoelectric element 101 contracts, lowering the variable guide post 100, which lowers the minimum travelling height of the tape 4.

When the tension of the tape 4 is relatively small, such as during play mode or record mode, travelling of the tape 4 is likely to be unstable. The tape 4 is the state 4a and exerts only a small force on the tension regulator post 13. As a result, the tension regulator post 13 is in the state of 13a, and the tension regulator arm 14 in the state of 14a. In this state, the quantity of light received by the photo sensor 210 is large, the output from the photo sensor 210 is large, and the voltage received by the laminated piezoelectric element 101 is also large. Hence, the laminated piezoelectric element 101 is in an expanded state, the variable guide post 100 is in a high position, and the minimum travelling height of the tape 4 is high. Thus, the embodiment of the invention shown in FIG. 6 causes the tape 4 to receive sufficient restricting force from the variable guide post 100 when tension in the tape 4 is low, to ensure that the tape 4 travels stably.

When the tape 4 is changed to a relatively high tension state, such as would occur when the tape transporting apparatus is in the rewind mode, the strength of the tape 4 is weak and damage is likely to occur. However, in the embodiment of the invention shown in FIG. 6, the tension in the tape 4 causes the tape 4 to exert a strong force on the tension regulator post 13, causing the tension regulator post 13 to move from state 13a to state 13b, which causes tension regulator arm 14 to move from state 14a to state 14b. This move decreases the quantity of light received by the photo sensor 210, causing the output of the photo sensor 210 to decreases and the voltage received by the laminated piezoelectric element 101 decreases as well. In response, the laminated piezoelectric element 101 contracts, lowering the variable guide post 100 and the minimum travelling height of the tape 4. In this lowered state, there is less restricting force on the lower edge of the tape 4, preventing damage to the tape 4.

Figure 7:
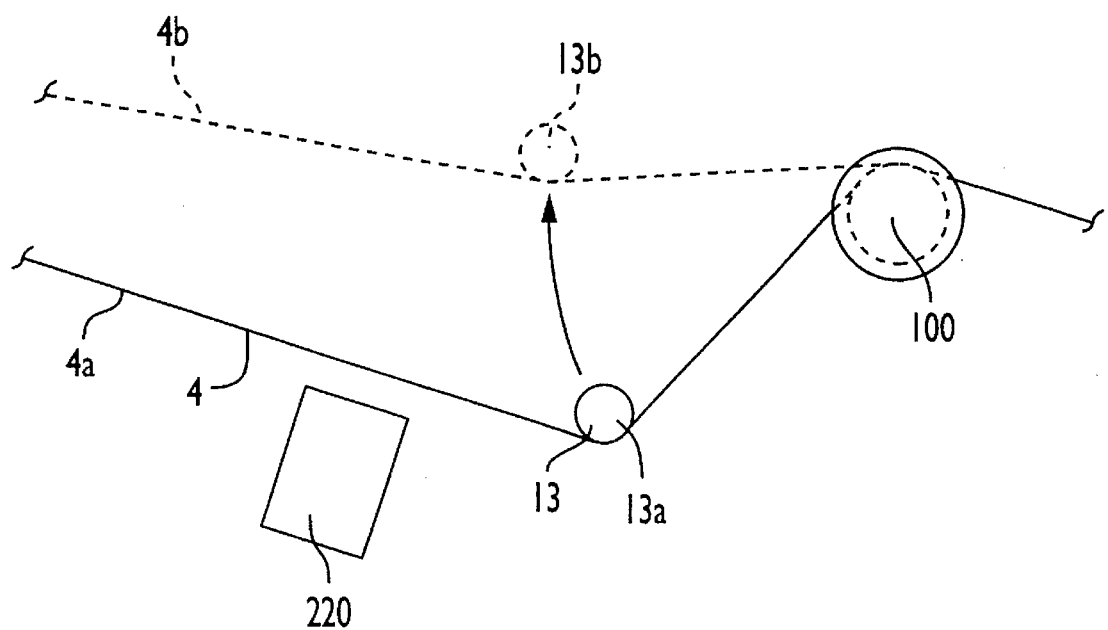
FIG. 7 represents a plan view in a fourth embodiment of the invention showing a second variation of a tape path detecting device.

FIG. 7 represents a fourth embodiment of the invention, showing a second variation of a tape path detecting means (or device). By way of illustration, FIG. 7 can be viewed in conjunction with FIGS. 3 and 5. FIG. 7 shows a photo sensor 220 affixed at a specific position near the tension regulator post 13, such that the surfaces of the emitter and receiver of the photo sensor 220 are approximately parallel to the surface of the tape 4 and the range of possible distances between the photo sensor 220 and the tape 4 is the range indicated by the range B in FIG. 5.

When the tension in the tape 4 is low and the tape 4 is in the state 4a, the distance between the tape 4 and the photo sensor 220 corresponds to distance Q, referring back to FIG. 5. When the tension in the tape 4 is high and the tape 4 is in the state of 4b, the distance between the tape 4 and the photo sensor 220 corresponds to distance R in FIG. 5. The relation of output from the photo sensor 220 to the distance between the tape 4 and the photo sensor 220 varies as shown in FIG. 5, and the voltage received by the laminated piezoelectric element 101 is directly proportional to the output of the photo sensor 220.

When the tape 4 is running in play or record mode, the tension in the tape 4 is low, and the height of the tape must be constrained sufficiently to enable stable travelling. The tape 4 is in the state 4a, the distance between the tape 4 and the photo sensor 220 is Q, and as shown in FIG. 5, the output from the photo sensor 220 is large. Therefore, the voltage received by the laminated piezoelectric element 101 is large and the laminated piezoelectric element 101 expands, raising the variable guide post 100 and setting a high minimum travelling height for the tape 4. Thus, the embodiment shown in FIG. 7 provides sufficient restricting force to the tape 4 when the tension in the tape 4 is low to permit stable travelling.

When operation changes from play mode to rewind mode, tension in the tape 4 is high, weakening the strength of the tape 4 and increasing the likelihood that the tape will be damaged. However, the embodiment shown in FIG. 7 shows that the tension in the tape 4 causes the tension regulator post 13 to move, and the tape 4 moves from state 4a to state 4b. The distance between the tape 4 and the photo sensor 220 increases from Q to R, and as shown in FIG. 5, the output from the photo sensor 220 decreases. The voltage received by the laminated piezoelectric element 101 decreases as well, causing the laminated piezoelectric element 101 to contract, lowering the variable guide post 100. This lowers the minimum travelling height of the tape and prevents damage to the tape 4.

In this embodiment of the current invention, changes in tape path were detected by the movement of the tension regulator post 13. Alternatively, in the case where other guide posts move along with the travelling mode to change the tape path, movement of those guide posts may also be monitored to detect changes.

Figure 8:
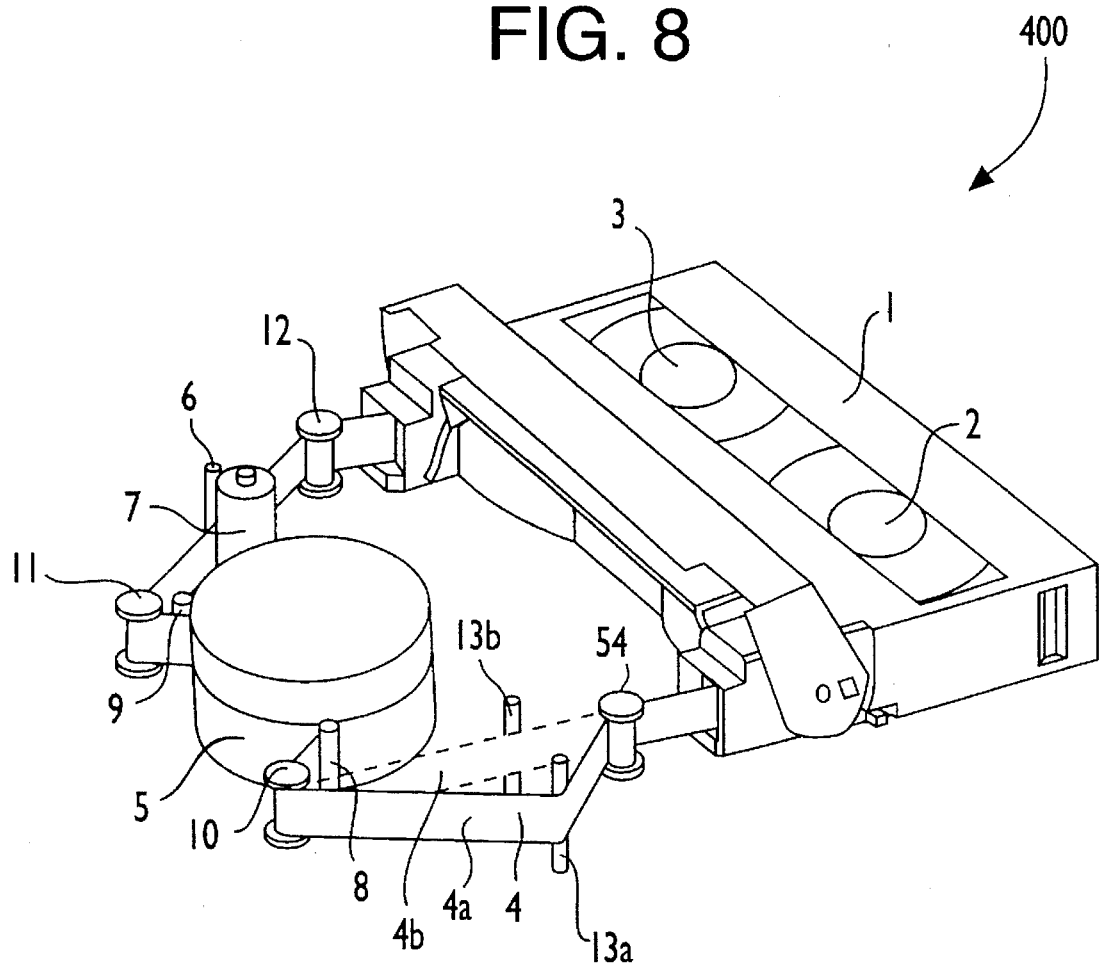
FIG. 8 represents a perspective view of the invention in the fifth, sixth and seventh embodiments of the invention.
Figure 9:
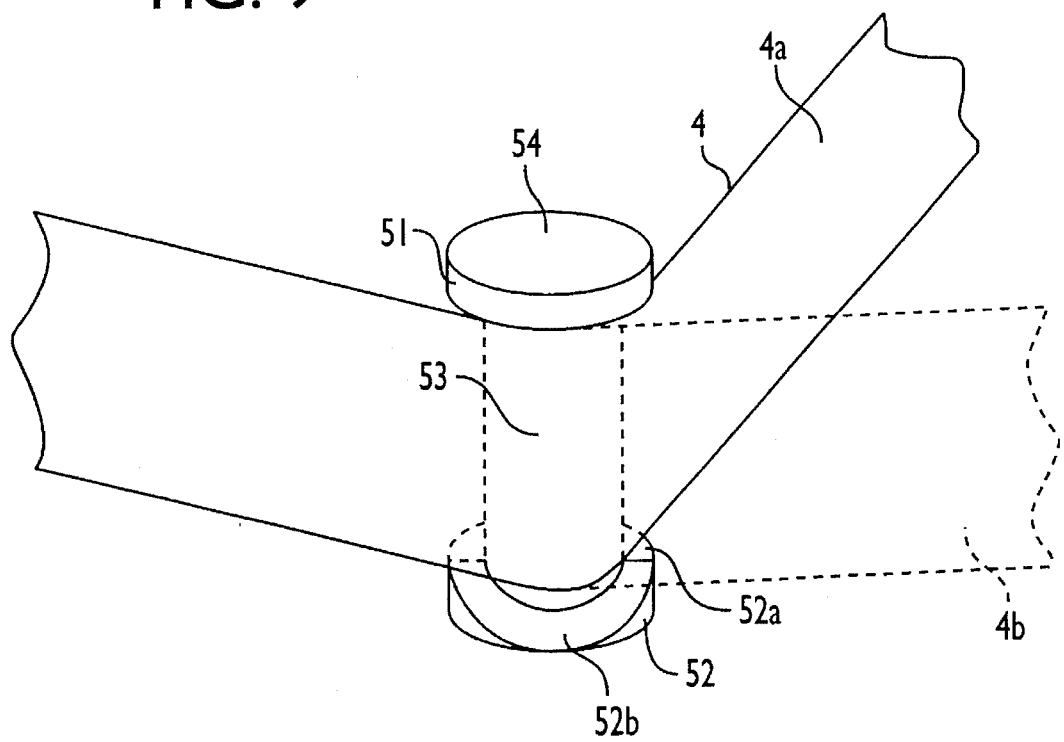
FIG. 9 represents a perspective view in a fifth embodiment of the invention of a guide post depicted in FIG. 8.

FIGS. 8 and 9 show a fifth embodiment of the invention. FIG. 9 shows a perspective view of a guide post 54 in the fifth embodiment. The guide post 54 defines the minimum travelling height of the lower edge of the tape 4, and comprises flanges 51 and 52, and a tape guide 53.

The winding angle of the tape 4 on the tape guide 53 is large when the tension of the tape 4 is relatively small and the tape is in state 4a, and is small when the tape tension is relatively large and the tape 4 is in state 4b. The upper surface of the flange 52 of the guide post 54 around which the winding state of the tape 4 varies, comprises two regions: a region of strong restricting force (a plane 52a, which is normal to the tape guide 53), and a region of weak restricting force (an inclined plane 52b, which is inclined downward from plane 52a towards the bottom surface of the flange 52).

By setting the rotational angle of the flange 52, the tape 4 is defined in the plane 52a when the tape tension is low, and the tape 4 is defined in the inclined plane 52b when the tape tension is high.

When the tension in the tape 4 is relatively low, such as when the tape transporting apparatus is in play and record mode, travelling of tape 4 is likely to be unstable. However, as mentioned above, the minimum travelling height of the tape 4 is defined by the plane 52a of the flange 52, so that sufficient restricting force is provided to the tape 4 to maintain stable travelling.

When the tension in the tape 4 increases, the tape is weakened and damage is likely to occur. Hence, the embodiment shown in FIG. 9 provides that the winding angle of the tape 4 on the tape guide 53 decreases, and the flange 52 is positioned in such a way that the lower edge of the tape 4 contacts only the inclined plane 52b. The height of inclined plane 52b is lower than the height of plane 52a, and consequently the minimum travelling height of the tape 4 is lowered. As a result, there is less restricting force on the tape 4 and the damage to tape 4 can be prevented.

Merely by way of example, the embodiment shown in FIG. 9 depicts a weak restricting force region as the horizontal plane 52a, but the weak restricting force region may comprise, for example, a plane at a smaller inclination angle than that of inclined plane 52b.

Figure 10:
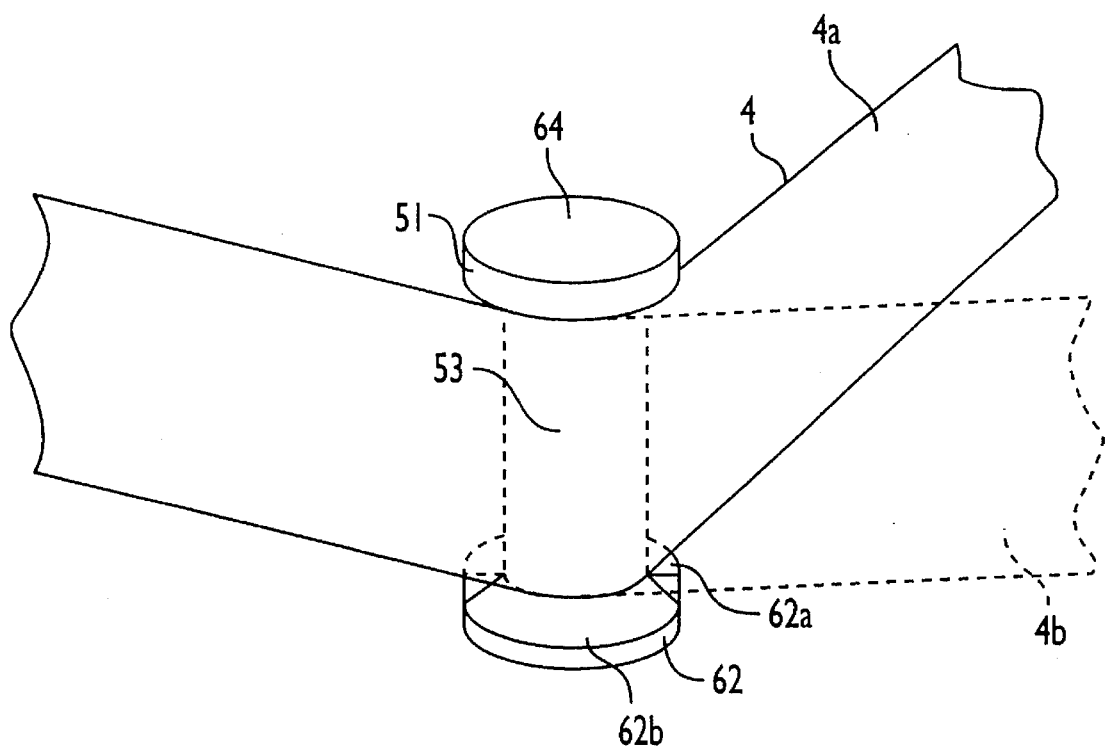
FIG. 10 represents a perspective view in a sixth embodiment of the invention of a guide post depicted in FIG. 8.

FIGS. 8 and 10 show a sixth embodiment of the invention. FIG. 10 is a perspective view of a guide post 64, which is a modification of the flange 52 of the guide post 54 in FIG. 9.

The guide post 64 comprises flanges 51 and 62, and a tape guide 53. The winding angle of the tape 4 around the guide post 64 varies, as it does around the guide post 54 of the fifth embodiment shown in FIG. 9. The flange 62 defines the height of the lower edge of the tape 4. The upper surface of the flange 62 of the guide post 64, around which the winding state of the tape 4 varies, comprises two regions: a region of strong restricting force (a plane 62a, which is normal to the tape guide 53), and a region of weak restricting force (a truncated conical surface 62b, which tapers downward from plane 62a towards the bottom surface of the flange 62). The rotational angle of the flange 62 is set such that when the tension in the tape 4 is relatively small, such as exists in play and record mode, and the tape 4 is in state 4a, the plane 62a defines the height of the tape 4a. Conversely, when the tension of the tape 4 is relatively large and the tape is in state 4b, the conical surface 62b defines the height of the tape 4.

When the tension of the tape 4 is relatively low, such as exists when the tape transporting device is in play mode, tape 4 must receive sufficient guidance to maintain a height at which the tape 4 will travel stably. As mentioned above, when tape 4 is in state 4a, the plane 62a defines the minimum travelling height of the tape 4, and provides tape 4 with sufficient restricting force to maintain a sufficient travelling height to enable stable travelling.

When the tape operation is changed from play mode to a mode causing relatively high tension in the tape 4, such as exists in rewind mode, the tape 4 is weakened and damage to the tape 4 is more likely to occur. As mentioned above, in this state where tape 4 is in state 4b, the winding angle of the tape 4 around the tape guide 53 decreases, and the guide post 64 is positioned such that the minimum travelling height of the lower edge of the tape 4 is defined by the conical surface 62b. This surface 62b is lower than the plane 62a, and lessens the restricting force on the tape 4, thereby preventing damage to the tape 4.

Merely by way of illustration, in the drawing of the embodiment shown in FIG. 10, the boundary between the sector of the flange 62 defined by plane 62a and the sector of the flange 62 defined by the conical surface 62b is normal to the plane 62a, but this boundary may also be a smooth curve.

Figure 11:
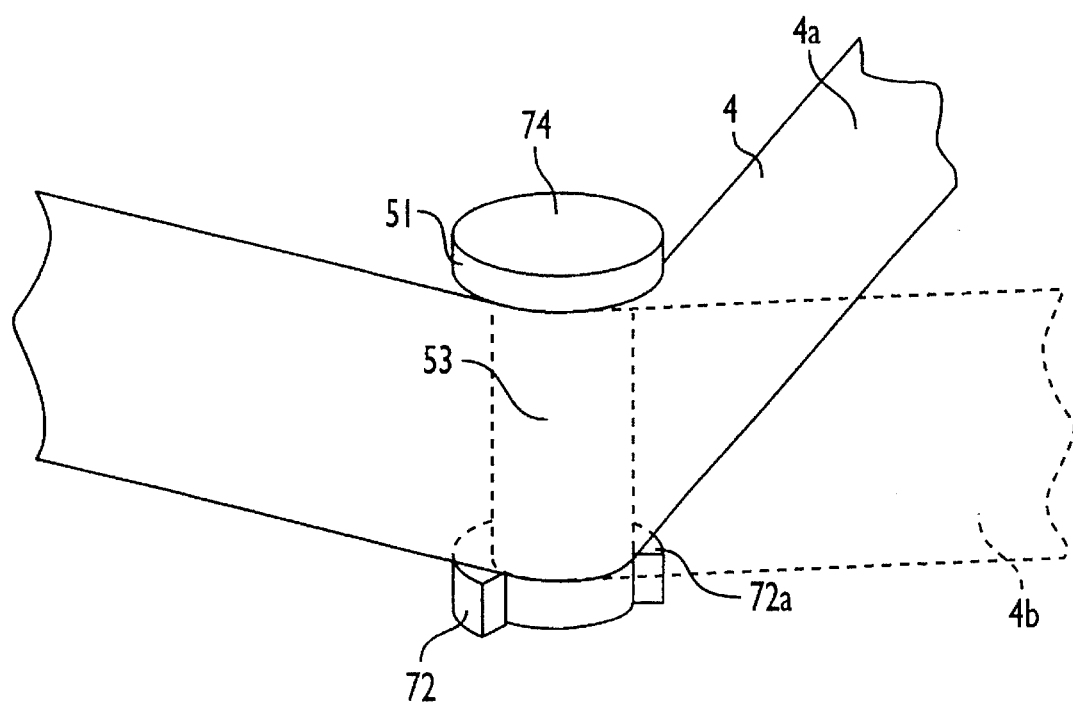
FIG. 11 represents a perspective view in a seventh embodiment of the invention of a guide post depicted in FIG. 8.

FIGS. 8 and 11 show a seventh embodiment of the invention. FIG. 11 is a perspective view of a guide post 74, which is a modification of the flange 52 of the guide post 54 of the fifth embodiment shown in FIG. 9. The guide post 74, around which the winding state of the tape 4 varies, comprises flanges 51 and 72, and tape guide 53. The flange 72 comprises two regions: a region of strong restricting force (a plane 72a, which is normal to the tape guide 53) and a region of weak restricting force (a region where the flange does not define the minimum travelling height). The rotational angle of the flange 72 is positioned such that when the tension in the tape 4 is relatively low and the tape 4 is in a state 4a, the plane 72a defines the height of the tape 4 at both the incident point and exit point of the tape 4 from the guide post 74. Conversely, when the tension of the tape 4 is relatively high, such as exists in the rewind mode, the tape is in a state 4b, and the plane 72a defines the height of the tape 4 only at the exit point.

When the tension of the tape 4 is relatively low, such as exists in play mode, tape 4 must receive sufficient guidance to maintain a height at which the tape 4 will run stably. As mentioned above, when tape 4 is in state 4a, the plane 72a defines the minimum travelling height of the tape 4 at both incident point and exit point, and provides tape 4 with sufficient restricting force to maintain a sufficient travelling height to enable stable travelling.

When the tape operation is changed from play mode to a mode causing relatively high tension in the tape 4, such as exists in rewind mode, the tape 4 is weakened and damage to the tape 4 is more likely to occur. As mentioned above, in this state where tape 4 is in state 4b, the winding angle of the tape 4 around the tape guide 53 decreases, and the guide post 74 is positioned such that the minimum travelling height of the lower edge of the tape 4 is defined by plane 72a only at the exit point. The incident point is not defined by flange 72 thereby preventing damage to the tape 4.

Merely by way of example, in the fifth, sixth and seventh embodiments shown in FIGS. 8–11, the lower flange of the guide post defines the minimum travelling height of the tape 4. Alternatively, the upper flange of the guide post may define the travelling height of the tape 4, in which case, the lower surface of the upper flange comprises a strong restricting force region and a weak restricting force region.

Figure 12:
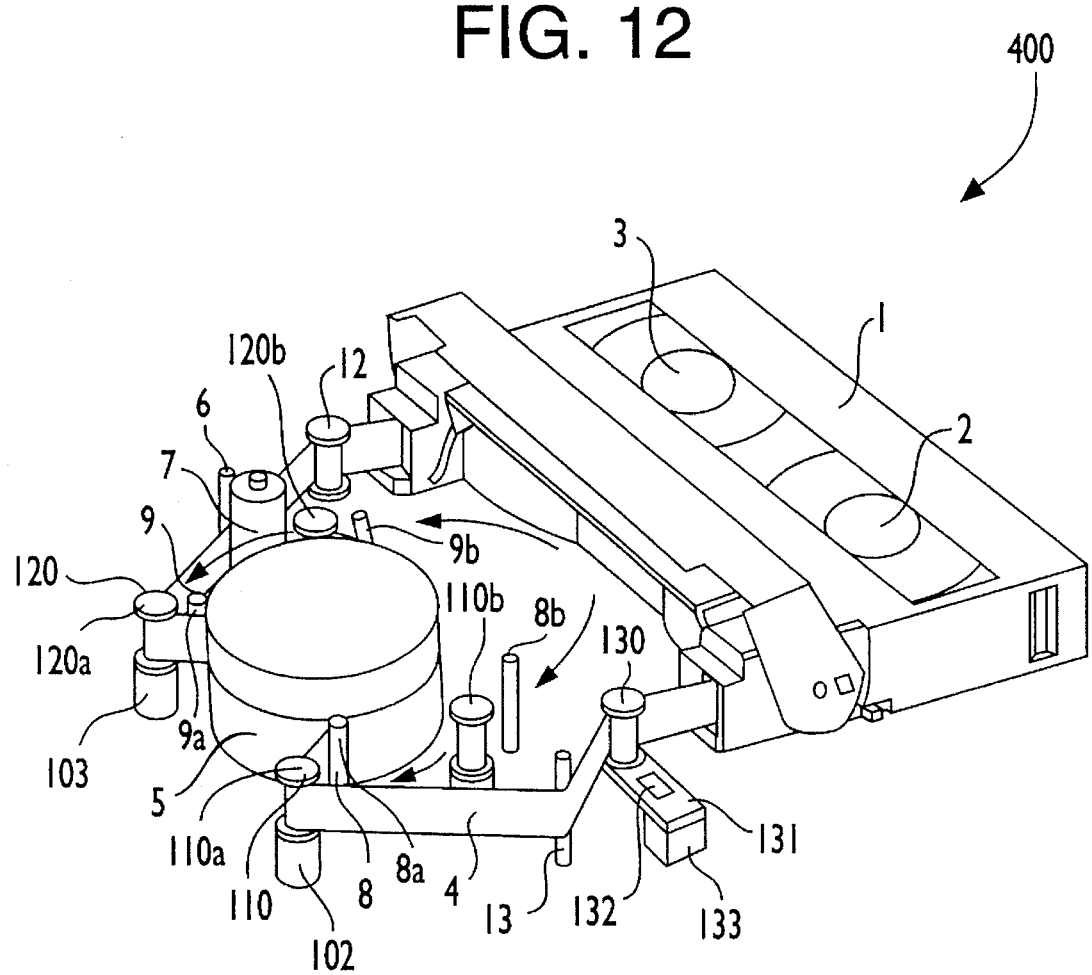
FIG. 12 represents a perspective view in an eighth embodiment of the invention.

FIG. 12 shows a perspective view of an eighth embodiment of the invention. When loading the tape 4, the tension regulator post 13 draws out the tape 4 from the cassette 1. Next, variable guide posts 110 and 120 and inclined posts 8 and 9 move in the direction indicated by the arrows to wind the tape 4 on the cylinder 5. When unloading, the variable guide posts 110 and 120 and inclined posts 8 and 9 move in the reverse direction indicated by the arrows, followed by the tension regulator post 13 moving to put the tape 4 back into the cassette 1. While loading, the variable guide posts 110 and 120 and inclined posts 8 and 9 move respectively to states 110a, 120a, 8a, and 9a. While unloading, the variable guide posts 110 and 120 and inclined posts 8 and 9 move respectively to the states of 110b, 120b, 8b, and 9b.

Variable guide posts 110 and 120 are respectively affixed to the upper surfaces of laminated piezoelectric elements 102 and 103. A guide post 130 is affixed to the upper surface of a plate spring 131. A strain gauge 132 also adheres to the upper surface of the plate spring 131. The plate spring 131 is affixed to the upper surface of a plate spring support stand 133. The guide post 130 defines the minimum height of the lower edge of the tape 4. The force exerted by the tape 4 on the guide post 130 causes the guide post 130 to move downwards, dislocating the plate spring 131. When the plate spring 131 is dislocated, the strain gauge 132 detects and issues the dislocation. The output is sent to the laminated piezoelectric elements 102 and 103, and while the tape 4 is being loaded and unloaded, the laminated piezoelectric elements 102 and 103 contract and expand in the vertical direction. The variable guide posts 110 and 120 move in the vertical direction in conjunction with the laminated piezoelectric elements 102 and 103 respectively. As the output of the strain gauge 132 indicates increasing tension in the tape 4 at the tape guide 130, the laminated piezoelectric element 102 contracts while the laminated piezoelectric element 103 expands.

During unloading, the winding angle of the tape 4 on the cylinder 5 is smaller than the winding angle that exists at the end of loading, and the winding angles of the tape 4 on the inclined posts 8 and 9 at the time unloading also differ from the angles existing at the end of loading. Accordingly, the tape 4 exerts forces in the vertical direction and the tape 4 is likely to be damaged by the restricting forces exerted on the tape 4 by the flanges of the variable guide posts 110 and 120. For example, when the winding angles of the tape 4 around the inclined posts 8 and 9 are smaller than the angles that exist at the end of loading, the tape 4 moves downward at the variable guide post 110, while moving upward at the variable guide post 120. At this time, the tape 4 exerts a vertical force on the guide post 130, and the guide post 130 sends an output to the laminated piezoelectric elements 102 and 103, causing laminated piezoelectric element 102 to contract and laminated piezoelectric element 103 to expand. The movements of the laminated piezoelectric elements 102 and 103 cause the height of the variable guide posts 110 and 120 to move vertically, which adjust the restricting forces applied to the tape 4. Hence, the tape 4 is put back into the cassette 1 without being damaged.

Whether the tape 4 is moved upward or downward by the variable guide posts 110 and 120 depends on whether the tape 4 is taken up on the supply reel 2 or the take-up reel 3 at the time of unloading, and on the winding state and inclination of the tape 4 on the guide post 130 while unloading, and therefore the output to the laminated piezoelectric elements 102 and 103 should be modified according to the situation.

Figure 13:
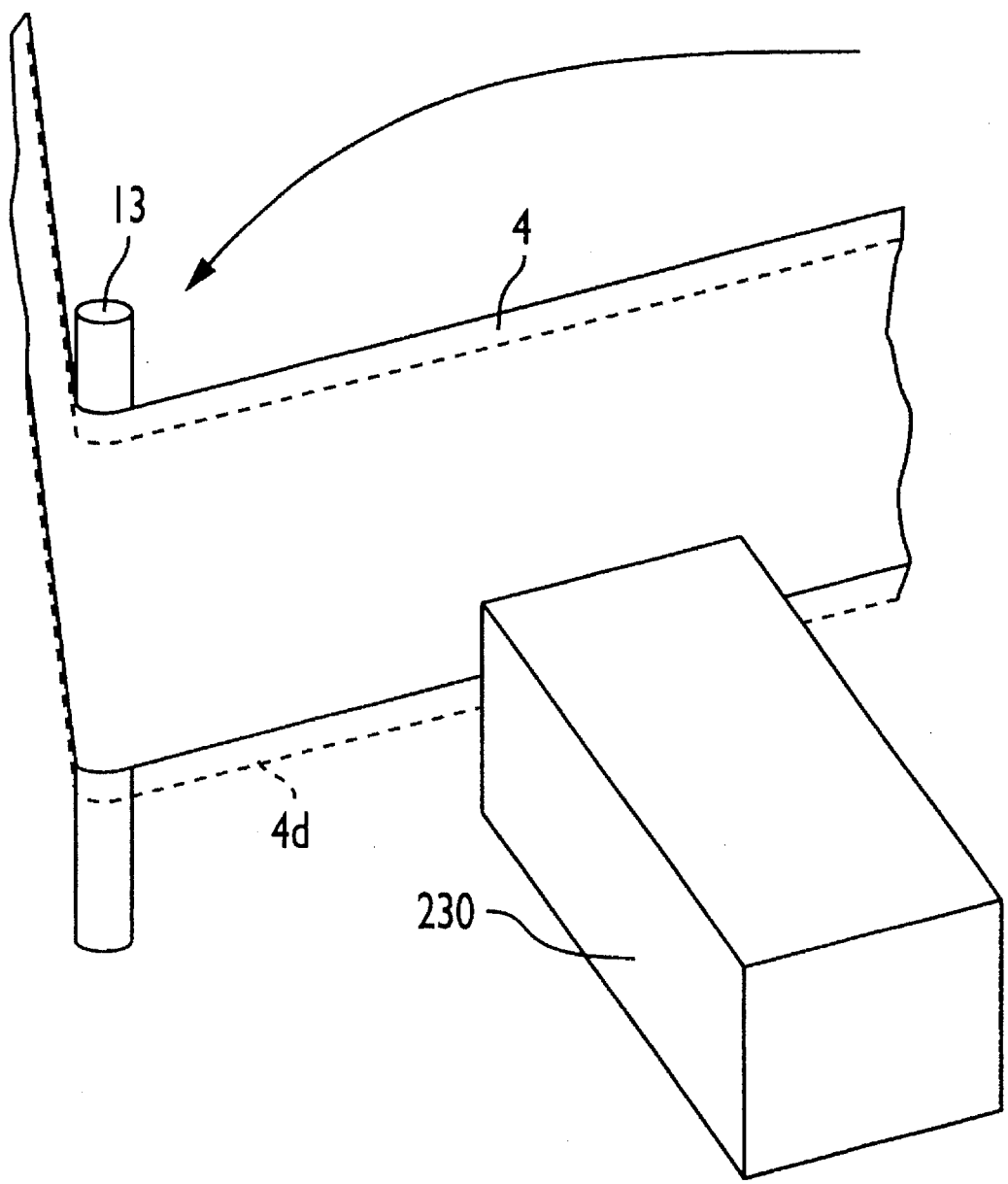
FIG. 13 represents a perspective view in a ninth embodiment of the invention showing a tape dislocation detecting means (or device).
Figure 14:
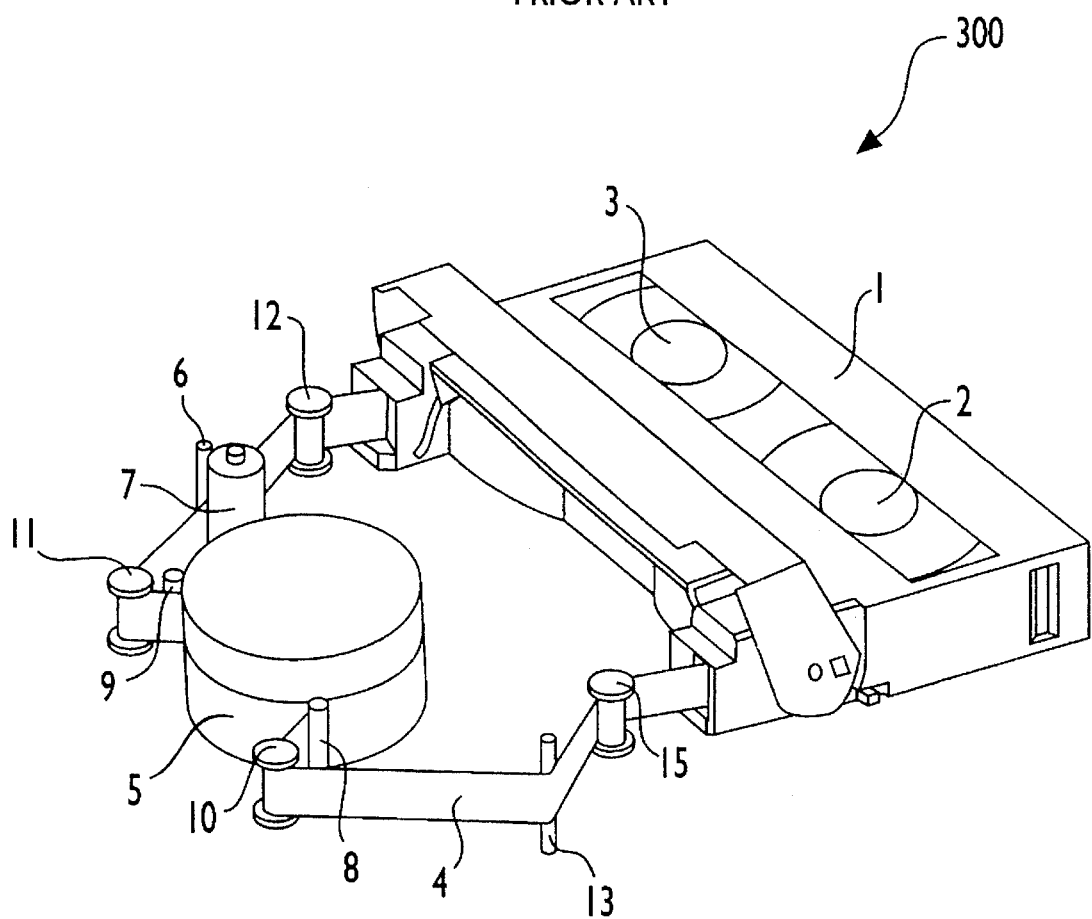
FIG. 14 represents a perspective view of a conventional tape transporting apparatus.

FIG. 13 is a perspective drawing showing a tape dislocation detecting means (or device) of the ninth embodiment of the invention, which detects the dislocation of the tape 4 near the tension regulator post 13 during loading and unloading. By way of illustration, FIG. 13 may be viewed in conjunction with FIG. 12.

A photo sensor 230 is affixed at a position such that the surfaces of the emitter and receiver are approximately parallel to the surface of the tape 4, and the quantity of light received by the photo sensor 230 increases when the height of the tape 4 becomes higher and decreases when the height of the tape 4 becomes lower. The output of the photo sensor 230 is proportional to the quantity of light received, which determines the voltage sent to the laminated piezoelectric elements 102 and 103, referring back to FIG. 12.

When loading, the tension regulator post 13 first moves as indicated by the arrow in FIG. 13. When the tension regulator post 13 finishes its movement, it triggers the photo sensor 230 to begin output. Next, the variable guide posts 110 and 120 move as indicated by the arrows in FIG. 12. When unloading, the movement of the variable guide posts 110 and 120 in the direction opposite the direction of the arrows in FIG. 12 is completed before the tension regulator post 13 begins movement in the reverse direction of the arrow indicated in FIG. 13. Therefore, while the variable guide posts 110 and 120 are moving during loading and unloading, the photo sensor 230 is always in an active state issuing output to the laminated piezoelectric elements 102 and 103.

When the tape 4 is dislocated downward to be in the state of 4*d*, for example, the tape 4 is likely to be damaged by the restricting force exerted by the lower flange of the variable guide post 110 on the tape 4. However, since the downward dislocation of the tape 4 changes the output of the photo sensor 230, the laminated piezoelectric element 102 contracts, and the variable guide post 110 is lowered. In this way, if the tape 4 is dislocated to a state 4*d* and tape damage is likely to result from the restricting force exerted on the tape 4 by a guide post, the photo sensor 230 detects the degree of dislocation of the tape 4 at the tension regulator post 13 and the variable guide posts 110 and 120 move vertically to prevent damage to the tape 4.

In the embodiment shown in FIG. 13, the vertical dislocation of the tape 4 while loading and unloading is detected, but the distance between the tape 4 and a photo sensor positioned similarly to the photo sensor 200 shown in FIG. 4 may be also detected. For example, by using a photo sensor 200 as shown in FIG. 4, deformation of the tape 4 while loading and unloading may be detected. In this case, the photo sensor 200, in addition to sending an output to the laminated piezoelectric element 101 in FIG. 4, may also send outputs to the laminated piezoelectric elements 102 and 103 in FIG. 12 to move the variable guide posts 110 and 120.

Furthermore, the embodiments shown in FIGS. 12 and 13 indicate that the variable guide posts 110 and 120 move in the vertical direction during loading and unloading to adjust the restricting force exerted on the tape 4. Alternatively, the inclination of the variable guide posts 110 and 120 and the inclined posts 8 and 9 and the tension regulator post 13 may be varied to adjust the restricting force exerted on the tape 4.

In the embodiments shown in FIGS. 1 through 13, the variable tape guides that define the travelling height of the tape 4 are cylindrical, but they may be composed, for example, of a curvature only in the portion around which the tape 4 winds.

Of course, it should be understood that a wide range of changes and modifications can be made to the preferred embodiment described above. It is therefore intended that the foregoing detailed description be understood that it is the following claims, including all equivalents, which are intended to define the scope of this invention.

What is claimed is:

1. A tape transporting apparatus comprising:

a tape guide having a flange for setting a travelling height of a tape and for exerting a restricting force on said tape, wherein said flange has a strong restricting force region for intensifying said restricting force exerted on said tape and a weak restricting force region for weakening said restricting force exerted on said tape, wherein said strong restricting force region and said weak restricting force region are selectively used for defining a running route of said tape on said flange depending on a winding state of said tape on said tape guide; and a post for varying the winding state of said tape on said tape guide depending on a tension of said tape such that said running route of said tape on said flange includes said weak restricting force region when said tension of said tape is high, and said running route of said tape on said flange includes at least a portion of said strong restricting force region when said tension of said tape is low.

* * * * *